United States Patent [19]

Hu

[11] Patent Number: 4,707,779
[45] Date of Patent: Nov. 17, 1987

[54] PROCESS FOR CONTROLLING A PARAMETER BASED UPON FILTERED DATA

[75] Inventor: Hung-Tzaw Hu, San Jose, Calif.

[73] Assignee: Measurex Corporation, Cupertino, Calif.

[21] Appl. No.: 673,966

[22] Filed: Nov. 20, 1984

[51] Int. Cl.$^4$ ........................................... G01N 25/56
[52] U.S. Cl. .................................. 364/148; 364/178; 364/469; 364/471; 364/581
[58] Field of Search .......................... 364/148-166, 364/177, 178, 471, 581, 469

[56] References Cited

U.S. PATENT DOCUMENTS

| 3,610,899 | 10/1971 | Dahlin | 364/554 |
| 3,805,032 | 4/1974 | Ross | 364/581 |
| 3,958,213 | 5/1976 | Scott | 364/157 |
| 3,970,830 | 7/1976 | White | 364/181 |
| 4,000,402 | 12/1976 | Higham | 364/469 |
| 4,161,030 | 7/1979 | de Jong | 364/581 |
| 4,488,240 | 12/1984 | Kapadia | 364/179 |

Primary Examiner—Jerry Smith
Assistant Examiner—Allen MacDonald
Attorney, Agent, or Firm—Hal J. Bohner

[57] ABSTRACT

A process for controlling a parameter based upon sampled data X(i) is disclosed. The process includes sampling the data x(i), repeatedly determining filtered data y(i) based upon two filter factors and controlling the parameter based upon y(i).

9 Claims, 3 Drawing Figures

PROCESS FOR CONTROLLING A PARAMETER BASED UPON FILTERED DATA

BACKGROUND OF THE INVENTION

The Field of The Invention

The present invention concerns a process for filtering data which has been gathered over time, such as data concerning the thickness of a sheet of material being produced.

State of the Art

In the production of sheet material such as paper, it is desired to maintain certain properties of sheet material as constant as possible throughout the entire material. Properties such as basis weight and moisture will vary along the machine direction, which is the path in which the sheet material is moved during production, and the properties will also vary in the cross machine direction which is perpendicular to the machine direction. In paper making, cross direction control can be accomplished by controlling such things as slice width, and machine direction control can be accomplished by controlling such parameters as stock feed to the head box.

In order to control the cross direction and machine direction parameters, the sheet material must be accurately measured and information concerning the measured parameters used to alter the process to maintain the parameters within desired limits. One applicable control system is taught in U.S. Pat. No. 3,610,899. According to the patent, a fundamental cross direction profile is obtained by exponentially weighting or filtering for corresponding points lying in the same machine direction path for each slice position. For each path or slice position, exponential filtering means or weighting means are provided which weight the data, such as basis weight data, in the same machine direction path in exponential fashion. Thereby basis weight data which is more remote in time is given relatively less weight than more recent data. According to the patent, the exponential filtering is accomplished using an algorithm, which is in the form of computer program. The patent teaches an algorithm utilizing constant filter factors.

I have found that in some circumstances the use of a single, constant filter factor can lead to inaccurate representation of the actual value of the measured parameter.

OBJECTS OF THE INVENTION

It is an object of the present invention to provide an improved method for obtaining filtered data.

It is another object of the invention to provide a method of obtaining filtered data concerning properties of a sheet of paper being manufactured.

Further objects and advantages of the present invention can be ascertained by reference to the specification and drawings, which are offered by way of example and not in limitation of the invention which is defined by the claims and equivalents.

DESCRIPTION OF THE PREFERRED EMBODIMENT

Figure 1:
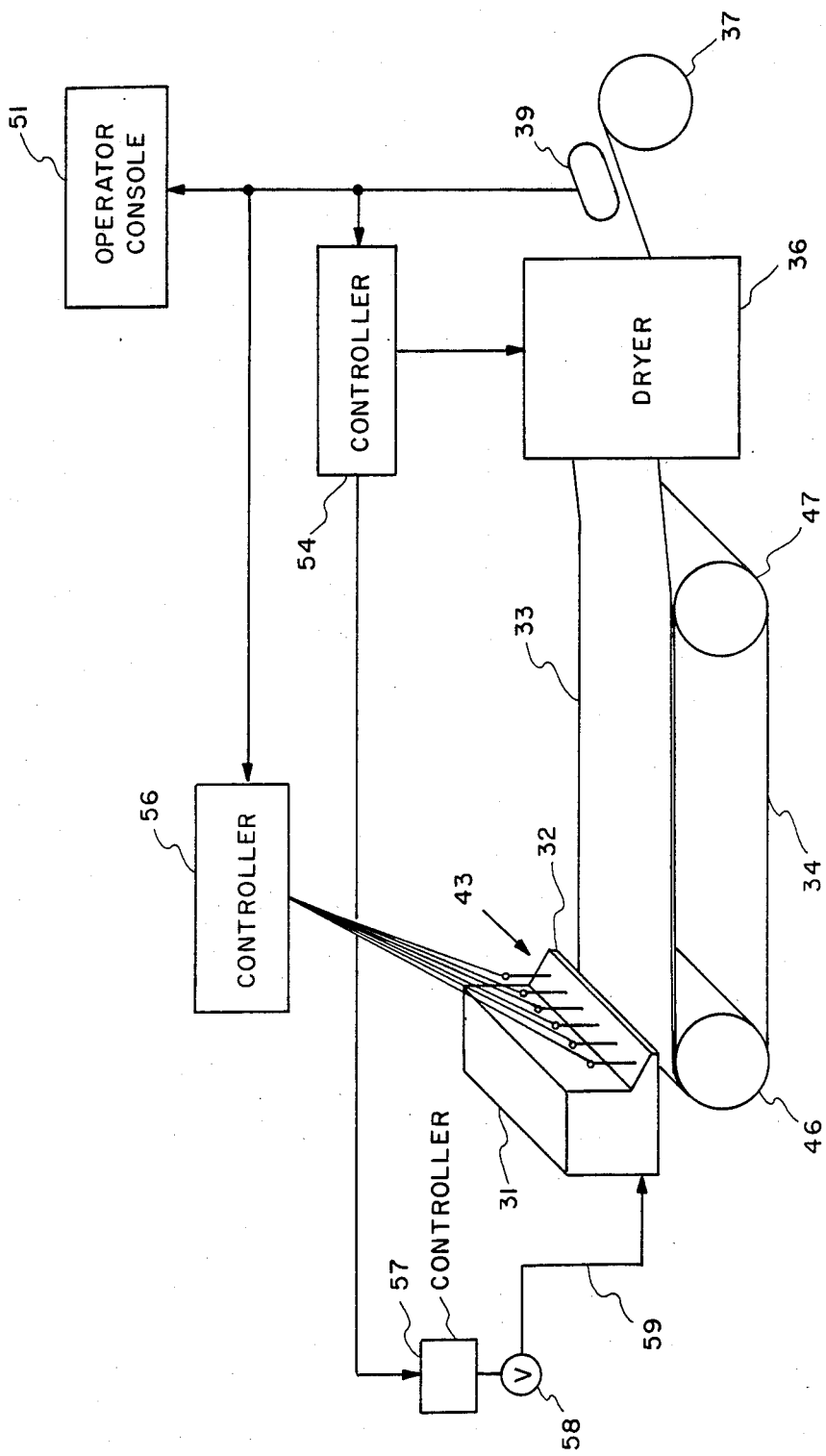
FIG. 1 is a diagram of a paper making machine and system incorporating the present invention.

The present invention can be used with various types of processes, one being the production of paper. FIG. 1 illustrates a paper machine which includes a headbox 31 for containing paper slurry. The headbox 31 includes a slice opening 32 which permits a controllable flow of pulp slurry to be deposited upon a moving wire screen 34 to form a sheet of paper 33. The wire screen 34 is rotated by two rolls 46 and 47.

The paper machine also includes a dryer 36 for receiving the sheet of paper 32 after it leaves the wire screen 34. A reel 37 is located following the dryer 36 for rolling up the paper prior to final shipment.

A scanner 39 is located near the reel 37 to scan across the sheet of paper and measure selected parameters such as basis weight and moisture at predetermined points within zones called slices across the sheet of paper. The scanner converts measurements of parameters to electrical signals which are transmitted to an operator console 51 which can process the data and also display the data for an operator. The electrical signals from the scanner are also transmitted to controllers 54 and 56.

The controller 54 controls machine direction parameters by controlling the dryer 36 and the feed of slurry to the headbox 31 via controller 57 which operates valve 58 which in turn controls the flow of paper pulp via line 59. Controller 56 controls the slice lip 32 by operating actuators 43.

Figure 2:
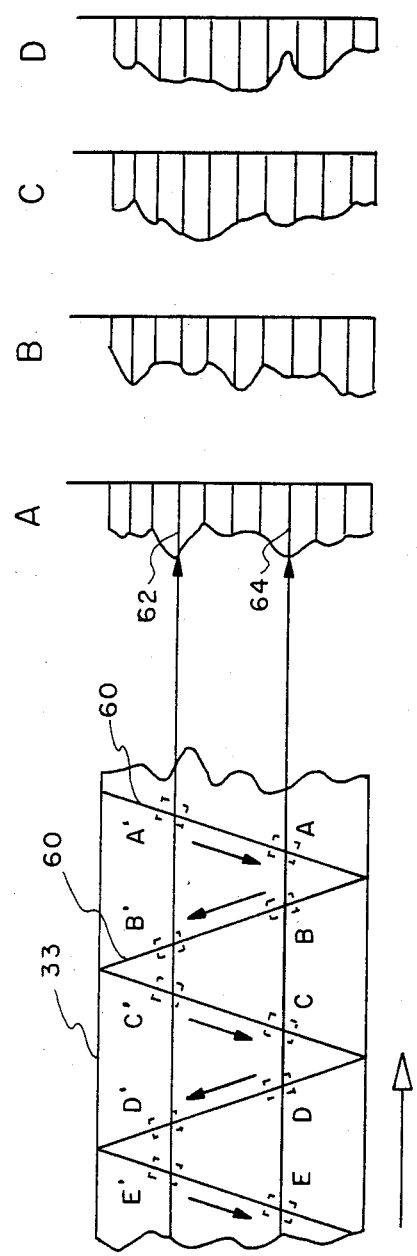
FIG. 2 is a diagram showing the arrangement of data which is filtered.

Turning now to FIG. 2, the sheet of paper 33 is shown traveling from left to right as indicated by the arrow. As the scanner 39 scans across the paper 33, its path of travel is indicated by lines 60. During the travel of the scanner 39 data is gathered at predetermined points across the sheet of paper in zones commonly known as slices. Two representative slices 62 and 64 are illustrated in FIG. 2 along with the corresponding positions of the scanner. Data is collected during each scan, and for the indicated scans the data is illustrated in this example by curves A, B, C, and D. Since the parameters are varying in both the cross direction and machine direction of the paper, it can be understood that the curves A, B, C, and D have shapes which differ from one another and are representative of the data gathered by the scanner 39 over time. In order to accurately control the process it is desirable to utilize the data from more than one scan since both cross direction and machine direction variations contribute to a particular measured item of data, and also random variations may affect data.

In order to remove random variations as completely as possible and also to separate machine direction from cross direction variations, the raw data received from the scanner is filtered.

Figure 3:
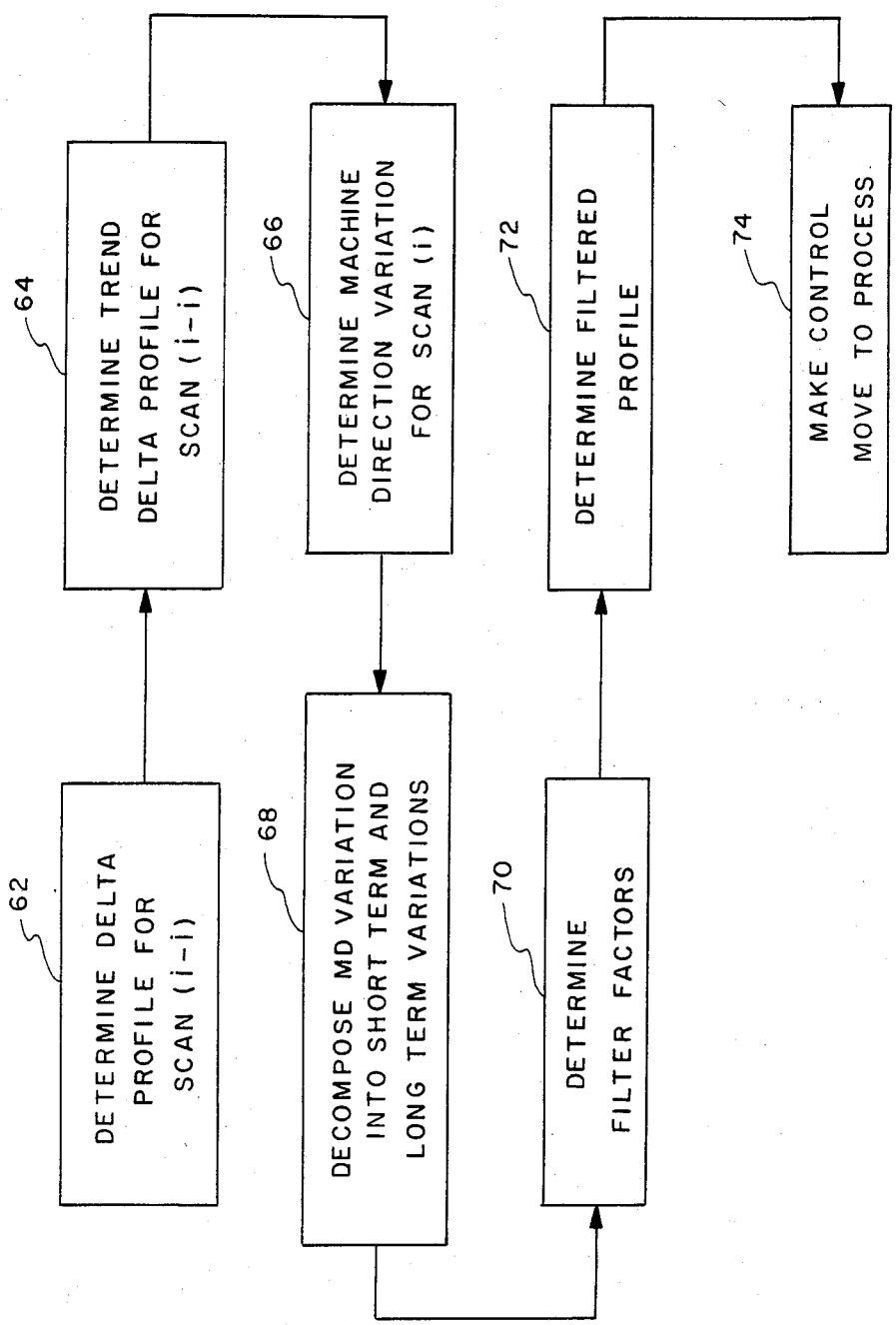
FIG. 3 is a flow chart indicating the process of the present embodiment.

FIG. 3 illustrates the filtering process according to the present embodiment. The filtering process illustrated in FIG. 3 is accomplished after each scan, for example, after scan A in FIG. 2. The particular time period illustrated in FIG. 3 is the computation shown for scan $i-1$ and scan $i$. After scan $i-1$ has been completed, the first step of the process is to determine the delta profile for scan $i-1$ according to the formula, $D(i-1,j) = X(i-1,j) - Y(i-1,j)$. The parameter $X(i-1,j)$ is the vector of measured values during the $i-1$ scan for each slice, $j$.

It should be understood that the two variables, $X(i-1,j)$ and $Y(i-1,j)$ are both available during this time based upon computations accomplished for prior scans. The exact method of computation will be discussed hereinafter.

After the determination of D(i−1,j) (step 62) the trend delta profile for scan (i−1) is then determined according to step 64. Specifically, the trend data profile T is calculated as follows:

$$T(i-1,j) = U[D(i-1,j)] + [1-U]T(i-2,j).$$

According to this formula, T(i−2,j) has been calculated from a previous iteration. U is a predetermined constant, and in some cases I have found an appropriate value for U to be 0.35.

After the computation in step 64, step 66, the determination of machine direction (MD) variation for scan (i) is accomplished. The machine direction variation is the following: X(i,j)−Y(i−1,j). Thereafter, according to step 68, the machine direction variation is decomposed into short-term and long-term variations where L(i,j) is the long-term machine direction variation and S(i,j) is the short-term machine direction variation computed as follows:

Case A:

If $T(i-1,j) \geq 0$

Then, $L(i,j) = Min\ X(i,j) - Y(i-1,j);\ T(i-1,j)$

If $X(i,j) - Y(i-1,j) \geq 0;$ or

L(i,j) = 0.0

If $X(i,j) - Y(i-1,j) < 0$

Case B:

If T(i−1,j)<0

Then, L(i,j)=0

If $X(i,j) - Y(i-1,j) \geq 0;$ or $L(i,j) = -1[Min\ ABS[X(i,j) - Y(i-1,j)],\ ABS[T(i-1,j)]]$ If X(i,j)−Y(i−1,j)<0

$S(i,j) = [X(i,j) - Y(i-1,j)] - L(i,j)$

After step 68, the filter factors are determined according to step 70 and the following formulas:

$$\beta(i,j) = a + \{[ABS[L(i,j)]/Nom]/M\}[U-a]$$

$$\Gamma(i,j) = a - \{[ABS[S(i,j)]/Nom]/M\}[a-F]$$

In the above two formulas a, M, U and L are all predetermined constants and satisfy the condition: 0<F<a<U<1.0.

Subsequent to step 70 the filtered profile is determined in step 72 according to the following formula:

$$Y(i,j) = \beta(i,j)L(i,j) + \Gamma(i,j)S(i,j) + Y(i-1,j)$$

After the filtered profile is determined, then the controller operates according to step 74 to make a control move to the process, if necessary.

During the computation according to steps 62-72, the scanner 39 continues to collect information according to the next scan i+1. Once the filtered profile for scan i has been determined according to step 72, the steps 62-72 are repeated for scan i+1, and so forth for succeeding scans. Each time a new filtered profile 72 is determined, the information is transmitted to controller 54. The controller, according to conventional practice, compares the filtered profile with targets or set points and makes control moves to valve controller 57 or other controls as appropriate.

It will be seen that the steps outlined in FIG. 3 rely upon the availability of filtered profile data for a scan i−1. Of course, when the process is initially begun, such data is not available. Thus, in practice, raw data is initially collected for a predetermined number of scans and the data is filtered according to the following equation:

$$Y(i,j) = \mu X(i,j) + [1-\mu]Y(i-1,j)$$

where, $\mu = 1$ for the first scan;
$\mu = \frac{1}{2}$ for the second scan;
$\mu = \frac{1}{3}$ for the third scan; etc.

After a sufficient number of scans, normally about 4 or 5, depending upon the circumstances, has been accomplished in this fashion, then the process according to FIG. 3 is initiated.

I claim:

1. A process for controlling a parameter of a sheet material which is being manufactured, comprising:
   (a) causing the sheet material to travel;
   (b) moving a scanning means across the sheet a plurality of times, i;
   (c) measuring a parameter of the sheet with the scanning means in a plurality of zones, j, which are disposed side-by-side across the sheet to produce a plurality of data;
   (d) filtering the data using a filter factor which is calculated based upon the data;
   (e) controlling the parameter based upon the filtered data.

2. A process according to claim 1 wherein the filter factor is calculated based upon the relative long-term variation in the data.

3. A process according to claim 2 wherein $\beta(i,j) = a + \{[ABS[L(i,j)]/Nom]/M\}[U-a]$ where $a$, U, M and Nom are predetermined constants and if $X(i,j) - Y(i-1,j) \geq 0$, then $L(i,j) = Min\ X(i,j) - Y(i-1,j);\ T(i-1,j)$ or if $X(i,j) - Y(i-1,j) < 0$, then L(i,j)=0.0, where $T(i-1,j) = U[D(i-1,j)] + [1-U]T(i-2,j);$ U is a constant; $D(i-1,j) = X(i-1,j) - Y(i-1,j);$ Y(i−1,j) is filtered data; and X(i,j) is the data measured by the scanning means.

4. A process according to claim 1 wherein the data measured by the scanning means is identified as X(i,j) and the filter factor is identified as $\beta(i,j)$.

5. A process according to claim 4 wherein a second filter factor $\Gamma(i,j)$ is calculated and the data is repeatedly filtered using the two filter factors $\beta(i,j)$ and $\Gamma(i,j)$.

6. A process according to claim 5 wherein $\Gamma(i,j)$ is calculated based upon the relative short-term variation of X(i,j).

7. A process according to claim 6 wherein $\Gamma(i,j) = \alpha - \{[ABS[S(i,j)]/Nom]/M\}[\alpha - F]$, where $\alpha$, F, M and Nom are predetermined constants and $S(i,j) = [X(i,j) - Y(i-1,j)] - L(i,j)$, wherein $Y(i-1,j)$ is filtered data and $L(i,j)$ is long-term machine direction variation.

8. A process for controlling a parameter of a sheet material which is being manufactured, comprising:
 (a) causing the sheet material to travel;
 (b) moving a scanning means across the sheet a plurality of times, i;
 (c) measuring a parameter of the sheet with the scanning means in a plurality of zones, j, which are disposed side-by-side across the sheet to produce a plurality of data;
 (d) filtering the data using a filter factor which is recalculated after the scanning means has been moved across the sheet;
 (e) controlling the parameter based upon the filtered data.

9. A process according to claim 8 wherein the filter factor is recalculated each time the scanning means has been moved across the sheet.

* * * * *